United States Patent
Shylo

[11] 4,031,332
[45] June 21, 1977

[54] TELEPHONE RINGER INSOLATOR

[75] Inventor: Paul Shylo, Arlington Heights, Ill.

[73] Assignee: Cook Electric Company, Morton Grove, Ill.

[22] Filed: Feb. 2, 1976

[21] Appl. No.: 654,404

[52] U.S. Cl. .................................. 179/84 R
[51] Int. Cl.² .................................. H04M 1/00
[58] Field of Search ............ 179/84 R, 84 A, 84 L, 179/81 R, 18 HB, 18 F, 18 FA

[56] References Cited
UNITED STATES PATENTS

| | | | |
|---|---|---|---|
| 3,536,852 | 10/1970 | Dolarmore | 179/84 R |
| 3,875,348 | 4/1975 | Kopec | 179/84 R |
| 3,919,488 | 11/1975 | Acevedo | 179/18 HB |

Primary Examiner—William C. Cooper
Assistant Examiner—Joseph Popek
Attorney, Agent, or Firm—Mason, Kolehmainen, Rathburn & Wyss

[57] ABSTRACT

A ringer isolator is used in conjunction with a pair of telephone lines to isolate ringer coils coupled to one of the telephone lines from a reference terminal except when a ringer signal is applied to the telephone lines. The ringer isolator includes an isolator such as a neon lamp/photo resistor coupler or a transformer partly coupled between the telephone lines and partly coupled to a thyristor such as a silicon controlled rectifier or a triac. The thyristor is coupled in series relationship between the ringer coils and the reference terminal. Normally, the thyristor is maintained nonconductive so that the ringer coils cannot be energized by potentials on the telephone lines. In response to the ringer signal being applied to the telephone lines, the isolator enables the thyristor to be rendered conductive so that the ringer coils are energized by the ringer signal.

17 Claims, 3 Drawing Figures

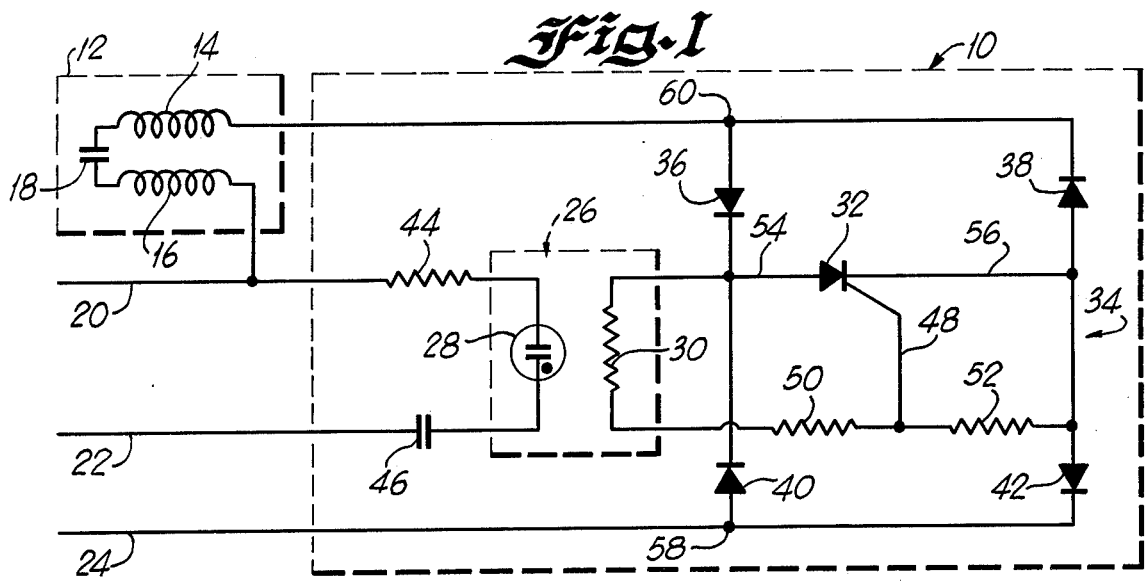
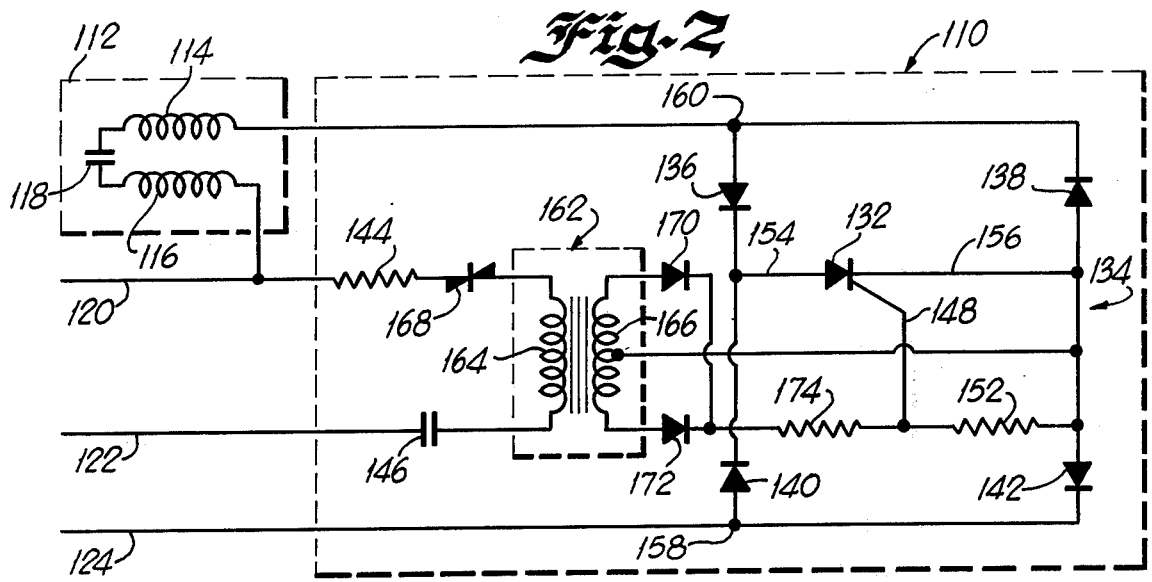
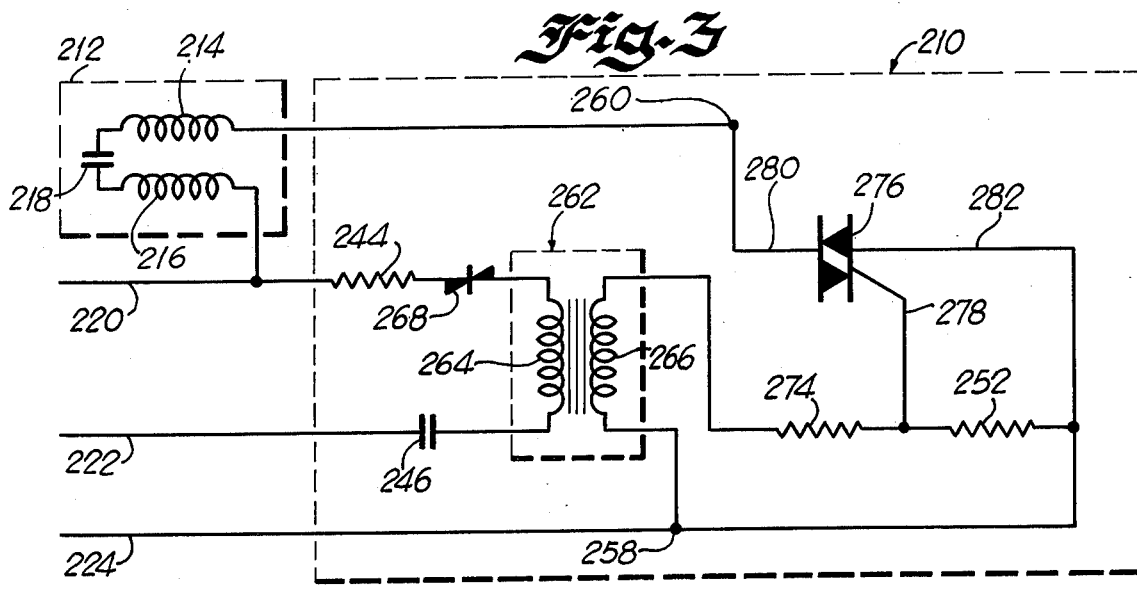

TELEPHONE RINGER INSOLATOR

The present invention relates generally to equipment used with telephone subscriber loops and more particularly, to a new and improved ringer isolator to isolate ringer coils of a telephone set from the telephone lines except when a ringing signal is placed on the telephone lines.

Each telephone set is equipped with a pair of ringer coils between which is disposed a bell clapper. In order to ring a telephone, a ringer signal is supplied from a telephone central office via the tip and ring lines in a pair of telephone lines to the ringer coils causing the bell clapper to oscillate back and forth such that it contacts against bells in the telephone set. The ringer signal consists of a 16–66 HZ AC potential voltage of 80–150 volts with a nominal voltage of approximately 95 volts at 20 HZ. Although the ringer coils could be coupled directly between ground and the tip or ring line, this tends to degrade the electrical balance of the telephone lines such that longitudinally induced voltages from power systems or the like cause the lines to have a high metallic noise voltage (i.e., a line-to-line voltage). In addition, if the longitudinal voltages produce a high enough line-to-line voltage due to the imbalance in the impedances of the telephone lines, the ringer coils can be energized even though there is no ringing signals impressed on the telephone lines.

In the past, in order to isolate the ringer coils from the tip or ring line except during the time when a ringing signal is applied to the line, gas tubes have been used in series with the ringer coils to isolate the ringer coils from the telephone lines as long as the potential across the tube was less than the ionization potential of the gas. However, the gas tubes tended to degrade the ringer coils efficiency and many times signaling and switching circuits had to be modified to accommodate the use of such gas tubes. Moreover, the gas tubes were relatively high in cost and tended to be rendered conductive (ionized) by transients occurring on the lines.

Solid state ringer isolators have also been used to isolate the ringer coils from the tip or ring line. In one such ringer isolator, a pair of thyristors couple one side of the ringer coils to the tip or ring line and the other side of the ringer coils is coupled to ground potential. Normally, the thyristors are nonconductive such that the ringer coils are isolated from the tip or ring line. When an AC ringer signal is applied to the lines, one of the thyristors is rendered conductive and couples the ringer coils to the ring line, for example, during a given half cycle of the AC ringer signal. During the other half cycle, the other thyristor is rendered conductive and the ringer coils remain coupled to the ring line. An example of such a ringer isolator is disclosed in IEEE Transactions in Communication Technology, Vol. Com-17, No. 4, August, 1969, pp. 496–500.

Although this type of ringer isolator tends to isolate the ringer coils from the telephone lines except when a ringer signal is present on the telephone lines, such a ringer isolator has been found deficient. Since the ringer coils are coupled between the thyristors and ground, the ringer isolator requires four wires to connect the ringer coils to the tip or ring line (i.e., one wire from each of the tip and ring lines to the thyristors, one wire from the thyristors to the ringer coils and one wire from the ringer coils to ground). As a consequence, if the ringer isolator is to be located at a given station remote from the telephone set or sets at that station, a four-wire base cord has to be used. If a four-wire base cord is not present, then a fourth wire has to be installed. Alternatively, the ringer isolator has to be mounted in each telephone set with a tip, ring and ground line connected to the telephone set by a three-wire base cord. This particular type of ringer isolator also is deficient in being susceptible to being energized by low line-to-line voltages (such as 6 volts) occurring on the tip and ring lines. Although the addition of a diac in series with the tip or ring line tends to lessen such ringer isolators susceptibility from being energized by transient line-to-line voltages, such ringer isolators still are activated by other than the ringer signals. In addition, since the thyristors could be subjected to high reverse-bias potentials, such that are caused by lightning or the like, the thyristors could be destroyed by those reverse-bias voltages rendering the ringer isolator inoperative.

Accordingly, objects of the present invention are to provide a new and improved ringer isolator; to provide a new and improved ringer isolator which can be coupled to a telephone set by a three wire base cord; to provide a new and improved ringer isolator that is less susceptible to line-to-line voltages than available ringer isolators; to provide a new and improved ringer isolator with a photo coupler or transformer to isolate a thyristor in the ringer isolator from the telephone lines; to provide a new and improved ringer isolator using a neon light/photo resistor coupler to couple a thyristor in the ringer isolator to the telephone lines; to provide a new and improved ringer isolator wherein the thyristor is in series between the ringer coils and ground potential; and to provide a new and improved ringer isolator wherein the thyristor is not susceptible to being damaged by high voltage transients on the telephone lines.

In accordance with these and other objects of the present invention, an embodiment of the present invention includes a ringer isolator coupled with the tip and ring telephone lines of a subscriber loop to isolate ringer coils in a telephone set from the telephone lines except when a ringer signal is present on the telephone lines. The ringer coils are coupled from the tip line to ground by a normally nonconductive thyristor. When a ringing signal is supplied to the tip and ring lines, an isolator such as a neon light/photo resistor coupler or a transformer and a diac enables a gating potential to be supplied to the thyristor so that the thyristor is rendered conductive and the ringer coils are energized by the ringer current present on the telephone lines. Once the ringer signal is removed from the lines, no gating potential is supplied to the thyristor by means of the isolator and the thyristor is rendered nonconductive. Whenever the thyristor is nonconductive, it acts as an open switch between the ringer coils and ground so that the ringer coils cannot be energized.

Many other objects and advantages of the present invention will become apparent from considering the following detailed description in conjunction with the drawings in which:

FIG. 1 is a schematic of a ringer isolator embodying the present invention;

FIG. 2 is an alternate embodiment of a ringer isolator embodying the present invention; and FIG. 3 is yet another embodiment of a ringer isolator embodying the present invention.

Referring now more specifically to FIG. 1 of the drawings, therein is disclosed a schematic diagram of a ringer isolator which is indicated generally by the number 10, and which embodies the present invention. The ringer isolator 10 is used to couple a ringer 12, consisting of a pair of ringer coils 14 and 16 and a DC blocking capacitor 18, between a tip line 20 of a pair of telephone lines including the tip line 20 and a ring line 22 and a ground terminal 24. The ringer isolator 10 includes an isolator or photo coupler 26 having a neon light 28 coupled between the tip line 20 and the ring line 22. The other portion of the photo coupler 26 is a photo-resistor 30 coupled to a thyristor or silicon controller rectifier 32. The silicon controlled rectifier 32 is coupled in series relationship between the ringer 12 and the ground terminal 24 by a full wave rectifier 34 consisting of diodes 36, 38, 40 and 42.

Whenever a ringer signal is applied to the tip and ring lines 20 and 22, the photo coupler 26 enables the silicon controlled rectifier 32 to be rendered conductive such that the ringer 12 is coupled to the ground terminal 24 through the full wave rectifier 34 and the silicon controlled rectifier 32. With the ringer 12 so coupled to the ground terminal 24, the ringer coils 14 and 16 are energized and a bell clapper (not shown) in a telephone set (also not shown) will strike against the bells located in the telephone set. The silicon controlled rectifier 32 will remain conductive as long as the ringer signal is present on the tip and ring lines 20 and 22. On the other hand, whenever the ringer signal is not present on the tip and ring lines 20 and 22, the silicon controlled rectifier 32 will be maintained nonconductive such that the connection between the ringer 12 and the ground terminal 24 is severed and the ringer coils 14 and 16 will not be energized.

More specifically, the neon light 28 of the photo coupler 26 is coupled across the tip and ring lines 20 and 22 by a resistor 44 and a DC blocking capacitor 46. Normally, the neon light 28 is in a non-breakdown state so that it does not emit any light. As long as the AC potential on the tip and ring lines 20 and 22 is below a specified level, the neon light 28 will remain in that state and the photo resistor 30 remains in a high resistance state such that the silicon controlled rectifier 32 cannot be rendered conductive. As a result, the ringer 12 is not coupled to the ground terminal 24 because the silicon controlled rectifier 32 acts as an open switch in series relationship between the ringer 12 and the ground terminal 24.

When it is desired to energize the ringer coils 14 and 16 with AC potential, an AC current is impressed on the tip and ring lines 20 and 22. The AC ringer signal is normally 70–85 volts, but sometimes is as low as 60 volts. The neon light 28, is selected to withstand transient line-to-line voltages below the ringer signal. In one embodiment, the neon light 28 is selected to be actuated by a 60 volt signal to insure that it responds to all ringer signals. In response to receiving a ringer signal through the resistor 44 and the capacitor 46 of a sufficient magnitude, the neon light 28 breaks down and emits radiant energy or light, which is in turn received by the photo resistor 30. The photo resistor 30 then decreases in resistance value to a relatively low resistance. Since the photo resistor 30 is now in a relatively low resistance state, a relatively positive gating potential is supplied to the silicon controlled rectifier 32.

More specifically, assuming that the tip line 20 is relatively positive with respect to the ring line 22 at the point in time when the ringer signal causes the neon light 28 to breakdown, a relatively positive potential is supplied to a gate electrode 48 of the silicon controlled rectifier 32 due to the current flowing through the ringer 12, the diode 36, the photo resistor 30, resistors 50 and 52 and the diode 42 from the tip line 20 to the ground terminal 24. Since an anode electrode 54 of the silicon controlled rectifier 32 is relatively positive with respect to a cathode electrode 56 of the silicon controlled rectifier 32, the silicon controlled rectifier 32 is rendered conductive and is maintained conductive. A current path is then formed from the tip line 20 through the ringer 12, the diode 36, the anode electrode 54 and the cathode electrode 56 of the silicon controlled rectifier 32, and the diode 42 to the ground terminal 24. The ringer coils 14 and 16 are energized by the ringing current causing the telephone set to ring.

Upon the reversal of the ringer potential on the tip and ring lines 20 and 22, or in other words, when the tip line 20 becomes relatively negative, the neon light 30 remains lit so that the photo resistor 30 remains in its low resistance state. A current path is still maintained from the tip line 20 through the ringer 12 to the ground terminal 24 via the diode 38, the cathode electrode 56 and the anode electrode 54 of the silicon controlled rectifier 32 and the diode 40. The silicon controlled rectifier 32 is maintained conductive because the anode electrode 54 is maintained relatively positive with respect to the cathode electrode 56 due to the biasing of the diodes 38 and 40, and the gate electrode 48 is maintained at a relatively positive potential.

In the event that the tip line 20 is relatively negative with respect to the ring line 22 when the ringer signal is applied to the tip and ring lines 20 and 22 causing the neon light 28 to be illuminated, the silicon controlled rectifier 32 will still be immediately rendered conductive. This is because a relatively positive potential is supplied to the gate electrode 48 due to the current flowing between the tip line 20 and the ground terminal 24 through the diode 40, resistors 30, 50, and 52, and the diode 38. Accordingly, as soon as a ringer signal is present on the tip and ring lines 20 and 22 of a sufficient magnitude to cause the neon light 28 to be lit, the ringer coils 14 and 16 are energized so that the telephone to which the ringer isolator 10 is coupled rings.

Shortly after the ringer current is removed from the tip line 20 and the ring line 22, the neon light 28 returns to its normal or unlit state and the photo resistor 30 reverts to its high resistance state. The silicon controlled rectifier 32 is no longer conductive so that the ringer 12 is disconnected from the ground terminal 24 and cannot be energized until another ringer signal is supplied to the tip line 20 and the ring line 22.

With the silicon controlled rectifier 32 acting as a switch to open or close the circuit between the ringer 12 and the ground terminal 24, the ringer 12 will be essentially disconnected except when a ringer signal is impressed on the tip and ring lines 20 and 22. Moreover, since the silicon controlled rectifier 32 is not rendered conductive unless the neon light 28 is energized, the point at which a signal on the tip and ring lines 20 and 22 will energize the ringer coils 14 and 16 can be accurately selected by proper selection of the neon light 28.

Now referring to FIG. 2 of the drawings, there is disclosed an alternate embodiment of the ringer isolator 10 which is generally designated by the number 110. In FIG. 2, those portions of the ringer isolator 110 and of equipment or lines coupled thereto which are the same as portions of the ringer isolator 10 or of equipment or lines coupled thereto are designated by the same numbers as the corresponding portions illustrated in FIG. 1 increased by 100.

The ringer isolator 110 is used to couple a ringer 112 having ringer coils 114 and 116 and a DC blocking capacitor 118 between a tip line 120 of a pair of telephone lines including the tip lines 120 and a ring line 122 and a ground terminal 124. The ringer isolator 110 includes an isolator or transformer 162 having a primary winding 164 and a secondary winding 166 and a diac 168. The primary winding 164 and the diac 168 are coupled between the tip line 120 and the ring line 122 by a resistor 144 and a capacitor 146. As long as the AC potential on the tip and ring lines 120 and 122 is below a specified level, the diac 168 remains nonconductive such that there is no AC potential supplied to the primary winding 164 of the transformer 162. As a result, no potential is supplied to a gate electrode 148 of a silicon controlled rectifier 132 from the secondary winding 166 of the transformer 162 through a full wave rectifier including diodes 170 and 172, and a biasing network including resistors 152 and 174. Consequently, the silicon control rectifier 132 remains nonconductive such that the ringer 112 is not coupled to the ground terminal 124.

When it is desired to energize the ringer coils 114 and 116 with AC potential, an AC ringer current is impressed on the tip and ring lines 120 and 122. The diac 168 is selected such that the transient line-to-line voltages do not affect it, but the AC ringer signal renders the diac 168 conductive. As a result, the AC ringer potential is impressed across the primary winding 164 of the transformer 162.

Assuming that the tip line 120 is relatively positive with respect to the ring line 122 at the point in time when the ringer signal is impressed across the primary winding 164 of the transformer 162, a relatively positive potential is supplied to the gate electrode 148 of the silicon control rectifier 132 due to the current that flows through the diode 170, the resistor 174, and the resistor 152 because of the AC potential impressed on the secondary winding 166 of the transformer 162. Since at this time, an anode electrode 154 of the silicon control rectifier 132 is relatively positive with respect to a cathode 156 of the silicon control rectifier 132, the silicon control rectifier 132 is rendered conductive and is maintained conductive.

A current path is then formed from the tip line 120 through the ringer 112, a diode 136, the anode electrode 154 and the cathode electrode 156 of the silicon control rectifier 132, and a diode 142 to the ground terminal 124. The ringer coils 114 and 116 thereby are energized by the ringing current causing the telephone set to ring.

Upon the reversal of the ringer potential on the tip and ring lines 120 and 122, or in other words, when the tip line 120 becomes relatively negative with respect to the ring line 122, the diac 168 still allows the AC ringing potential to be impressed across the primary winding 164. The gate electrode 148 still is maintained relatively positive because the AC signal impressed across the winding 166 will supply a relatively positive potential to the gate electrode 148 through the diode 172 and the resistors 174 and 152. In addition, the anode electrode 154 is maintained relatively positive with respect to the cathode electrode 156 due to the biasing of the diodes 138 and 140. As a result, a current path is still maintained from the tip line 120 through the ringer 112 to the ground terminal 124 through the diode 138, the cathode electrode 156 and the anode electrode 154 of the silicon control rectifier 132 and the diode 140.

It is noted that in the event the tip line 120 is relatively negative with respect to the ring line 122 when the ringer signal is applied to the tip and ring lines 120 and 122, the silicon control rectifier 132 will still be immediately rendered conductive. This is because a relatively positive potential still is supplied to the gate electrode 148 of the silicon controlled rectifier 132 due to the current flowing from the secondary winding 166 of the transformer 162 through the diode 172 and the resistors 174 and 152. Accordingly, as soon as the ringer signal is present on the tip and ring lines 120 and 122 and is of a sufficient magnitude to render the diac 168 relatively conductive, the ringer coils 114 and 116 are energized so that the telephone set to which the ringer isolator 110 is coupled rings.

After the ringer potential is removed from the tip and ring lines 120 and 122, the diac 168 reverts to its normally nonconductive state so that the transformer 162 no longer supplies a relatively positive gating potential to the gate electrode 148 of the silicon control rectifier 132. Consequently, the silicon control rectifier 132 reverts to its nonconductive state and the ringer 112 is effectively disconnected from the ground terminal 124 and cannot be energized by potential on the tip and ring lines 120 and 122 until a ringer signal is applied to the tip line 120 and the ring line 122.

FIG. 3 of the drawings discloses yet another embodiment of the ringer isolator 10. The ringer isolator disclosed in FIG. 3 is generally designated by the number 210. In FIG. 3, those portions of the ringer isolator 210 and of equipment or lines couspled thereto which are the same as portions of the ringer isolator 10, or of the equipment or lines coupled thereto, are designated by the same numbers as those corresponding portions illustrated in FIG. 1 increased by 200. The ringer isolator 210 utilizes a triac 276 rather than a silicon controlled rectifier as was utilized in the ringer isolators 10 and 110 in FIGS. 1 and 2, respectively.

As was the case with the ringer isolators 10 and 110, the ringer isolator 210 also is used to couple a ringer 212 having ringer coils 214 and 216 and a DC blocking capacitor 218 between a tip line 220 forming a part of a pair of telephone lines including the tip line 220 and a ring line 222, and a ground terminal 224. The ringer isolator 210 has an isolator or transformer 262 with primary winding 264 and secondary winding 266 and a diac 268. The primary winding 264 of the transformer 262 is coupled across the tip and ring lines 220 and 222 by a resistor 244 and a capacitor 246. Although the diac 268 is normally maintained nonconductive, such that no AC potential is impressed on the primary winding 264, the diac 268 will be rendered conductive when an AC ringer current is impressed on the tip and ring lines 220 and 222. In response to receiving the AC ringer signal through the capacitor 246, the diac 268 and a resistor 244, the AC potential impressed on the secondary winding 266 will cause a potential to be supplied to a gate electrode 278 of the triac 276 through re resistors 274 and 252. Assuming that at the time the ringer signal is impressed on the tip and ring lines 220 and 222, the tip line 220 is relatively positive with respect to the ring line 222, a realtively positive potential will be supplied through the ringer coils 214 and 216 and the capacitor 218 to a main terminal 280 of the triac 276 with respect to a main terminal 282 of the triac 276. Consequently, the triac 276 will become conductive so that the ringer coils 214 and 216 are energized by the ringer current. As a result, the telephone set rings.

Upon the reversal of the ringer potential on the tip and ring lines 220 and 222, the diac 268 will still remain conductive, such that a gating potential will be supplied to the gate 278 of the triac 276 through the transformer 262 and the resistors 274 and 252. The main terminal 280 will become relatively negative with respect to the main terminal 282, but the triac 276 will be maintained conductive. As a result, the ringer coils 214 and 216 will remain coupled to the ground terminal 224 such that the ringer coils 214 and 216 will remain energized.

In the event that the tip line 220 is relatively negative with respect to the ring line 222 when the ringing signal is impressed on the tip and ring lines 220 and 222, the triac 276 still will be rendered conductive. This is because a gating potential will still be supplied to the gate electrode 278 through the transformer 262. Consequently, the ringer coils 214 and 216 immediately will be energized by the ringer signal.

After the ringer current is removed from the tip line 220 and the ring line 222, the diac 268 will block any low magnitude AC signals on the tip and ring lines 220 and 222. The transformer 262 will no longer supply a gating potential to the gate electrode 278 of the triac 276 and the triac 276 will become nonconductive. The ringer coils 214 and 216 are thereby disconnected from the ground terminal 224 so that they can no longer be energized until another ringer signal is supplied to the tip line 220 and the ring line 222.

Advantageously, the ringer isolator 10, 110, 210 is symetric with respect to the tip and ring lines 20, 120, 220 and 22, 122, 222 and the connection of the ringer 12, 112, 212 and the ground terminal 24, 124, 224. More specifically, since the ringer isolator 10, 110, 210 is merely coupled across the tip and ring lines 20, 120, 220 and 22, 122, 222 and responds to AC potential on the tip and ring lines 20, 120, 220 and 22, 122, 222, the tip and ring lines 20, 120, 220 and 22, 122, 222 can be interchanged without affecting the operation of the ringer isolator 10, 110, 210.

Likewise, since the ringer isolator 10, 110, 210 is completely symetric with respect to the connection of the ringer 12, 112, 212 and the ground terminal 24, 124, 224, the connection of the ringer 12, 112, 212 and the ground terminal 24, 124, 224 can be interchanged without affecting the operation of the ringer isolator 10, 110, 210. Accordingly, if personnel would mistakenly couple the ringer 12, 112, 212 to a terminal 58, 158, 258 and the ground terminal 24, 124, 224 to a terminal 60, 160, 260, the ringer isolator 10, 110, 210 will still operate to isolate the ringer 12, 112, 212 from the tip and ring lines 20, 120, 220 and 22, 122, 222 except when a ringer signal is present on the telephone lines.

The ringer 10, 110, 210 has the further advantage of only requiring three leads or wires to be extended to a given telephone set. The only lines that have to extend from the ringer isolator 10, 110, 210 to the given telephone set is the tip line 20, 120, 220, a ringer line for connection to the terminal 60, 160, 260 and the ring line 22, 122, 222. The fourth lead coupled to the terminal 58, 158, 258 can be coupled to the ground terminal 24, 124, 224 at any remote point at which the ringer isolator 10, 110, 210 is located. Thus, in those instances where a given station, such as a house, has only a three base cord, the ringer isolator 10, 110, 210 can still be mounted at the service entrance or at a station protector associated with the house because only the three leads need be extended to the telephone set. In addition, a single ringer isolator 10, 110, 210 can be used even though the given station has a number of telephone sets coupled to the tip and ring lines 20, 120, 220 and 22, 122, 222.

The use of the photo coupler 26 or the diac 168 and the transformer 162, or the diac 268 and the transformer 262, also enables the ringer isolator 10, 110, 210 to be less susceptible to transient line-to-line voltages appearing across the tip line 20, 120, 220 and the ring line 22, 122, 222. As previously indicated, the neon light 28 or the diac 168 or the diac 268 can be selected to be energized by voltages at least as great as the minimum ringer signal impressed on the tip and ring lines 20, 120, 220 and 22, 122, 222. As a result, lesser magnitude transient potentials will not affect the operation of the ringer isolator 10, 110, 210. In addition, the ringer isolator 10, 110, 210 is less susceptible to being damaged by transients on the tip and ring lines 20, 120, 220 and 22, 122, 222. This is because the full wave rectifier 34, 134 insures that only forward bias currents are coupled through the anode and cathode electrodes 54, 154 and 56, 156 of the silicon controlled rectifier 32, 132 and the triac 276 is a bidirectional device. Thus, the ringer isolator 10, 110, 210 can withstand higher transient voltages without being damaged than can previous available ringer isolators.

The ringer isolator 10, 110, 210 has the additional advantage of not loading the tip and ring lines 20, 120, 220 and 22, 122, 222 as much as previously utilized solid state ringer isolators having a pair of thyristors. This is because the resistor 44, 144, 244, capacitor 46, 146, 246, and the neon light 26 or the diac 168 and the transformer winding 164 or the diac 268 and the transformer winding 264 establish a much higher impedance across the tip and ring lines 20, 120, 220 and 22, 122, 222 than the dual circuits required in coupling both thyristors to the telephone line in previously used ringer isolators. In fact, the impedance in certain embodiments of the ringer isolator 10, 110, 210 is ten times as great as the impedance of such previously used ringer isolators.

Although the present invention is described with reference to a several illustrative embodiments thereof, it should be understood that numerous other modifications and embodiments of the invention can be devised by those skilled in the art that will fall within the spirit and scope of the principles of this invention.

What is claimed as new and desired to be secured by Letters Patent of the United States is:

1. An isolator for selectively coupling a means to be energized which is coupled to one of a pair of telephone lines to a reference potential in response to an activating signal on the telephone lines, said isolator comprising:

a controlled conduction means coupled between said means to be energized and said reference potential, and an isolator means coupled to said telephone lines and to said controlled conduction means, said isolator means controlling said controlled conduction means to connect said means to be energized to said reference potential in response to said isolator means receiving said activating signal on said telephone lines.

2. An isolator for selectively coupling a means to be energized from one of a pair of telephone lines to a reference potential in response to an activating signal on the telephone lines, said isolator comprising:
a controlled conduction means coupled between said means to be energized and said reference potential,
an isolator means coupled to said telephone lines and to said controlled conduction means, said isolator means controlling said controlled conduction means to connect said means to be energized to said reference potential in response to said isolator means receiving said activating signal on said telephone lines, and
a full wave rectifier coupling said controlled conduction means to said means to be energized and said reference potential.

3. The isolator as set forth in claim 1 wherein said isolator means is a photo coupler means including a breakdown voltage device coupled between said pair of telephone lines and a photo resistor responsive to said breakdown voltage device, said photo resistor being coupled to said controlled conduction means.

4. The isolator as set forth in claim 1 wherein said isolator means is a breakdown voltage device and a transformer, said breakdown voltage device coupling said transformer across said pair of telephone lines.

5. The isolator as set forth in claim 1 wherein said controlled conduction means has a control electrode and a pair of output electrodes.

6. A ringer isolator for selectively coupling a ringer which is coupled to one of a pair of telephone lines to a reference terminal in response to a ringer signal on the telephone lines, said ringer isolator comprising:
a light emitting means coupled to said telephone lines and having first and second conduction states in response to said ringer signal,
a resistor means responsive to said light emitting means, said resistor means having a first resistance state when said light emitting means is in said first conduction state and a second resistance state when said light emitting means is in a second conduction state, and
a controlled conduction means coupled between said ringer and said reference terminal and coupled to said resistor means, said controlled conduction means has first and second controlled conduction states and is responsive to said resistor means by being in said first controlled conduction state when said resistor means is in said first resistance state to disconnect said ringer from said reference terminal and is in said second controlled conduction state when said resistor means is in said second resistance state to connect said ringer to said reference terminal.

7. A ringer isolator for coupling a ringer means to one of a pair of telephone lines and to a reference terminal in response to a ringer signal on said telephone lines, said ringer isolator comprising:
a controlled conduction means coupled to said ringer means and to said reference terminal,
a light emitting means coupled to said telephone lines, and
a variable impedance means having a variable impedance value controlled by said light emitting means, said variable impedance means being coupled to said controlled conduction means such that said variable impedance means controls the conductivity of said controlled conduction means.

8. The ringer isolator as set forth in claim 7 wherein said variable impedance means is a photo resistor having a relatively high resistance value when said light emitting means is not emitting light and a relatively low resistance value when said light emitting means is emitting light, said controlled conduction means being maintained nonconductive when said photo resistor is in its relatively high resistance state and is rendered conductive when said photo resistor is in its relatively low resistance state.

9. The ringer isolator as set forth in claim 7 wherein said controlled conduction means is a silicon controlled rectifier having a pair of output electrodes and a control electrode, said variable impedance means being coupled between said control electrode and one of said output electrodes and said pair of output electrodes being coupled in series relationship between said ringer means and said reference terminal.

10. An isolator for selectively coupling means to be energized from one of a pair of telephone lines to a reference terminal in response to an activating signal on the telephone lines, said isolator comprising:
a controlled conduction means having a control electrode and a pair of output electrodes, one of said output electrodes being coupled to said means to be energized and the other of said output electrodes being coupled to said reference terminal; and
an isolator means coupled between said telephone lines and coupled to said control electrode of said controlled conduction means, said isolator means enabling said controlled conduction means to couple said means to be energized to said reference terminal through said output electrodes whenever said isolator means responses to said activating signal on said telephone lines.

11. A ringer isolator for coupling a ringer means to one of a pair of telephone lines and to a reference terminal in response to a ringer signal on said telephone lines, said ringer isolator comprising:
a controlled conduction means coupled to said ringer means and to said reference terminal, said controlled conduction means having a control electrode and a pair of output electrodes,
a full wave rectifier coupled to said controlled conduction means such that said pair of output electrodes are maintained in series relationship between said ringer means and said reference terminal by said full wave rectifier,
a light emitting means coupled to said telephone lines, and
a variable impedance means having a variable impedance value controlled by said light emitting means, said variable impedance means being coupled to said controlled conduction means such that said variable impedance means is coupled between one of said output electrodes and said control electrode and controls the conductivity of said controlled conduction means.

12. A ringer isolator for coupling a ringer means to one of a pair of telephone lines and to a reference terminal in response to a ringer signal on said telephone lines, said ringer isolator comprising:
- a controlled conduction means coupled to said ringer means and to said reference terminal, said controlled conduction means is a silicon controlled rectifier having a pair of output electrodes and a control electrode and said pair of output electrodes being coupled in series relationship between said ringer means and said reference terminal,
- a full wave rectifier means coupling said pair of output electrodes in series relationship between said ringer means and said reference terminals,
- a light emitting means coupled to said telephone lines, and
- a variable impedance means having a variable impedance value controlled by said light emitting means, said variable impedance being coupled to said controlled conduction means such that said variable impedance means is coupled between said control electrode and one of said output electrodes and controls the conductivity of said controlled means.

13. An isolator selectively coupling a means to be energized which is coupled to one of a pair of telephone lines to a reference terminal in response to an activating signal on the telephone line, said isolator comprising:
- a transformer having a primary winding and a secondary winding,
- a breakdown voltage device coupling the primary winding of said transformer to said telephone lines,
- a controlled conduction means coupled between said means to be energized and said reference terminal, said controlled conduction means being coupled to the secondary winding of said transformer such that said controlled conduction means connects said means to be energized to said reference potential in response to said primary winding of said transformer receiving said activating signal on said telephone lines.

14. The isolator as set forth in claim 13 wherein said controlled conduction means has a pair of output electrodes and a control electrode, said control electrode being coupled to said secondary winding of said transformer and one of said output electrodes being coupled to said means to be energized and the other of said output electrodes being coupled to said reference terminal.

15. The isolator as set forth in claim 13 wherein said breakdown voltage device is a diac.

16. The isolator as set forth in claim 13 wherein said controlled conduction means is a triac.

17. The isolator as set forth in claim 13 wherein said controlled conduction means is coupled between said means to be energized and said reference terminal by a full wave rectifier.

* * * * *

UNITED STATES PATENT OFFICE
CERTIFICATE OF CORRECTION

Patent No. 4,031,332        Dated June 21, 1977

Inventor(s) Paul Shylo

It is certified that error appears in the above-identified patent and that said Letters Patent are hereby corrected as shown below:

Cover page, in the title, change "INSOLATOR" to --ISOLATOR--.

Column 1, line 2, change "INSOLATOR" to --ISOLATOR--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks